United States Patent
Gharabegian et al.

(10) Patent No.: US 8,684,758 B2
(45) Date of Patent: Apr. 1, 2014

(54) TERMINAL UNIT HAVING FUSED COMBINER/DISTRIBUTION BUS BAR ASSEMBLY

(75) Inventors: Alan Gharabegian, Topsfield, MA (US); Jerry L. Mosesian, Newburyport, MA (US)

(73) Assignee: Mersen USA Newburyport-MA, LLC, Newburyport, MA (US)

( * ) Notice: Subject to any disclaimer, the term of this patent is extended or adjusted under 35 U.S.C. 154(b) by 215 days.

(21) Appl. No.: 13/251,612

(22) Filed: Oct. 3, 2011

(65) Prior Publication Data

US 2013/0084726 A1    Apr. 4, 2013

(51) Int. Cl.
*H01R 4/60* (2006.01)

(52) U.S. Cl.
USPC ............. 439/212; 439/76.2; 439/620.26

(58) Field of Classification Search
USPC ........... 439/212, 214, 718, 721, 723–724, 439/620.26, 620.27, 620.29, 620.33, 439/620.34, 76.2, 949
See application file for complete search history.

(56) References Cited

U.S. PATENT DOCUMENTS

| | | | |
|---|---|---|---|
| 3,265,937 A | 8/1966 | Sturdivan | 317/119 |
| 3,312,874 A | 4/1967 | Stanback | 317/119 |
| 4,310,211 A | 1/1982 | Bunnell et al. | 339/91 R |
| 4,722,701 A * | 2/1988 | Bradt | 439/718 |
| 4,785,378 A * | 11/1988 | Hinckley et al. | 361/652 |
| 5,047,604 A * | 9/1991 | Grass et al. | 200/294 |
| 5,108,314 A * | 4/1992 | Takano et al. | 439/620.34 |
| 5,717,161 A | 2/1998 | Wakata | 174/50 |
| 5,726,852 A * | 3/1998 | Trifiletti et al. | 361/115 |
| 2003/0070368 A1 | 4/2003 | Shingleton | 52/173.3 |
| 2007/0252670 A1 | 11/2007 | Darr | 337/143 |
| 2011/0121984 A1 | 5/2011 | Schripsema | 340/635 |

OTHER PUBLICATIONS

Ferraz Shawmut, BS88 Low Voltage Fuse Holders For F1 & F2 type General Purpose Fuse Links, Low Voltage Blue Dot, Product Brochure, Ferraz Shawmut S.A.S., 1, rue Jean Novel, 69626 Villeurbanne Cedex, France, Aug. 2007.

* cited by examiner

*Primary Examiner* — Xuong Chung Trans
(74) *Attorney, Agent, or Firm* — Kusner & Jaffe (57) ABSTRACT

A terminal unit having a bus bar assembly, a lug assembly, and one or more circuit protection devices attached to the bus bar assembly. The bus bar assembly includes a bus bar and a mounting unit for holding the bus bar and providing a structure for attaching circuit protection devices to the bus bar assembly. The bus bar is made of an electrically conductive material, while mounting unit is made of an electrically non-conductive (insulating) material, such as a plastic, thereby providing a "touch safe" enclosure.

14 Claims, 8 Drawing Sheets

TERMINAL UNIT HAVING FUSED COMBINER/DISTRIBUTION BUS BAR ASSEMBLY

FIELD OF THE INVENTION

The present invention relates generally to combining or distributing AC or DC circuits, and more particularly to a terminal unit having a fused combiner/distribution bus bar assembly.

BACKGROUND OF THE INVENTION

In the distribution of electrical power, a bus bar is used to conduct electricity within a switchboard, distribution board, substation or other electrical apparatus. The bus bar commonly takes the form of a strip of copper or aluminum. Each current source electrically connected to the bus bar is fused.

Terminal units are used in a wide range of applications to distribute or combine current from a plurality of power sources. One application that is becoming more common is the combination/distribution of current generated by a plurality of photovoltaic source circuits associated with solar power generation devices, such as solar cells or photovoltaic arrays. A terminal unit is used to combine multiple photovoltaic source circuits to produce a single combined output circuit.

A conventional terminal unit including a "comb" bus bar may be assembled in the following manner. A din rail is mounted to a back plane of a panel. Next, fuse holders are snapped onto the din rail. The fingers of the comb bus bar are inserted into respective fuse holder openings and torqued to fuse holder specification to secure the fingers thereto. The bus bar is then mounted to the back plane using standoffs. Incoming wires are inserted into each fuse holder socket and torqued to the fuse holder specification to secure the incoming wires thereto. One or two large cables are attached to the bus bar via a wire lug. If "touch safe" operation is desired, then a large plastic (e.g., plexi-glass) protective cover is mounted over the entire terminal unit to prevent contact with conductive elements.

The present invention provides a fused combiner/distribution bus bar assembly that provides "touch safe" operation without the use of a protective cover over the terminal unit.

SUMMARY OF THE INVENTION

In accordance with the present invention, there is provided a terminal unit comprising (1) a bus bar assembly including: (a) a bus bar made of electrically conductive material, and (b) a mounting unit made of an electrically non-conductive material; and (2) one or more circuit protection devices electrically connectable with the bus bar and a circuit, each circuit protection device including a housing having (a) first and second opposing engagement members engageable with the mounting unit to attach the circuit protection device to the bus bar assembly, and (b) a terminal.

In accordance with another aspect of the present invention, there is provided a bus bar assembly comprising: (a) a bus bar made of electrically conductive material, said bus bar including a plurality of contact members for making electrical contact with a circuit protection device attachable to the bus bar assembly; (b) a mounting unit made of an electrically non-conductive material, said mounting unit including a pair of outward extending flanges that respectively engage with first and second opposing engagement members of the circuit protection devices attachable to the bus bar assembly.

An advantage of the present invention is the provision of a terminal unit that safely and economically combines and distributes current.

Another advantage of the present invention is the provision of a terminal unit that provides touch safe operation.

Still another advantage of the present invention is the provision of a terminal unit that is easier to assemble and install, as compared to existing terminal units.

Yet another advantage of the present invention is the provision of a terminal unit that reduces space requirements, as compared to existing terminal units.

These and other advantages will become apparent from the following description taken together with the accompanying drawings and the appended claims.

BRIEF DESCRIPTION OF THE DRAWINGS

The invention may take physical fowl in certain parts and arrangement of parts, an embodiment of which will be described in detail in the specification and illustrated in the accompanying drawings which form a part hereof, and wherein.

DETAILED DESCRIPTION OF THE INVENTION

Figure 1:
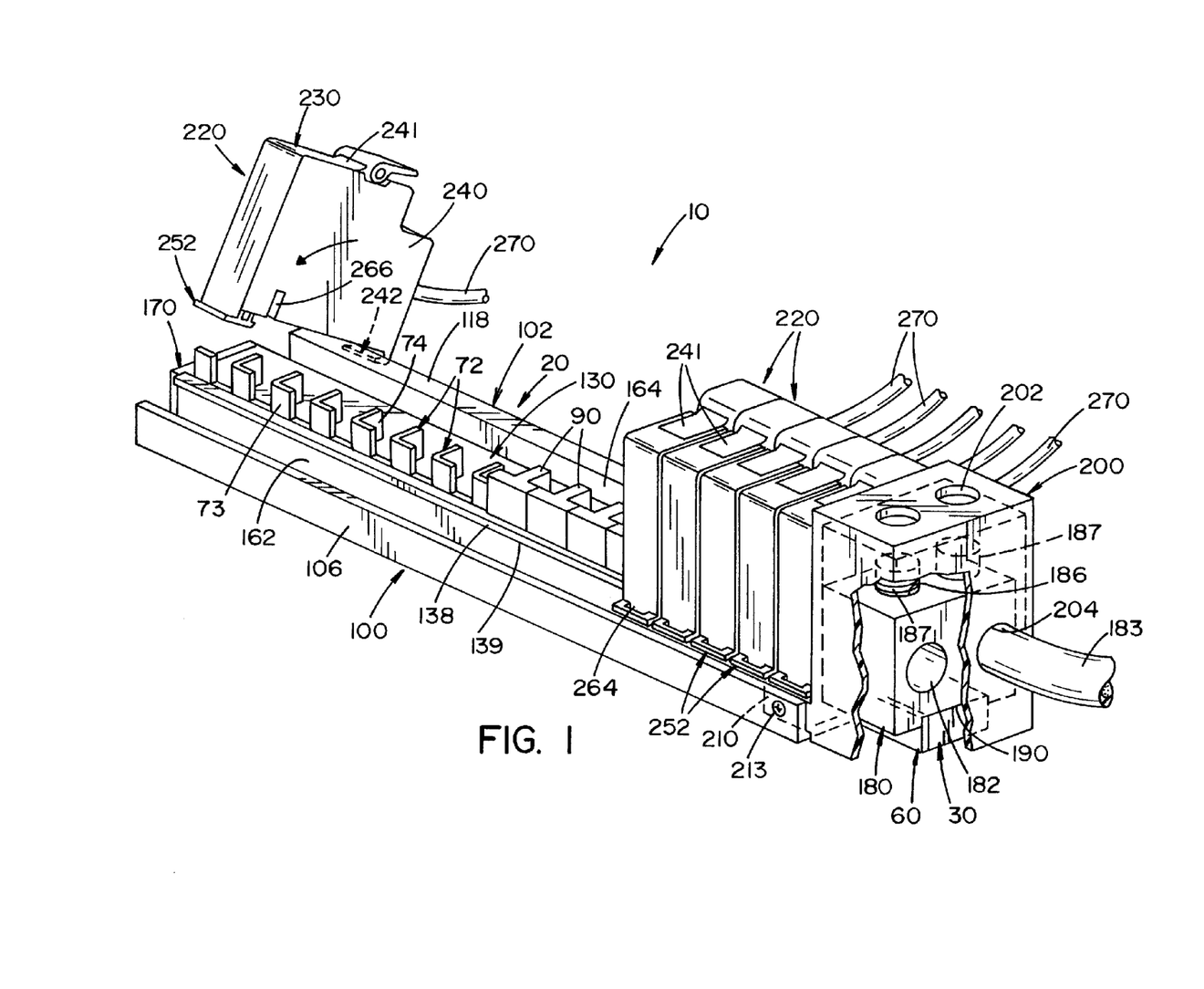
FIG. 1 is a perspective view of a terminal unit according to an embodiment of the present invention, said terminal unit including a bus bar assembly, a lug and one or more fuse holders.

Referring now to the drawings wherein the showings are for the purposes of illustrating an embodiment of the invention only and not for the purposes of limiting same, FIG. 1 shows a terminal unit 10 according to an embodiment of the present invention. Terminal unit 10 is generally comprised of a bus bar assembly 20; a lug assembly comprised of a lug 180 and associated lug housing 200; and one or more circuit protection devices 220. In the illustrated embodiment, circuit protection devices 220 take the form of a fuse comprised of a fuse element (not shown) that is housed within a fuse holder 230.

Figure 3:
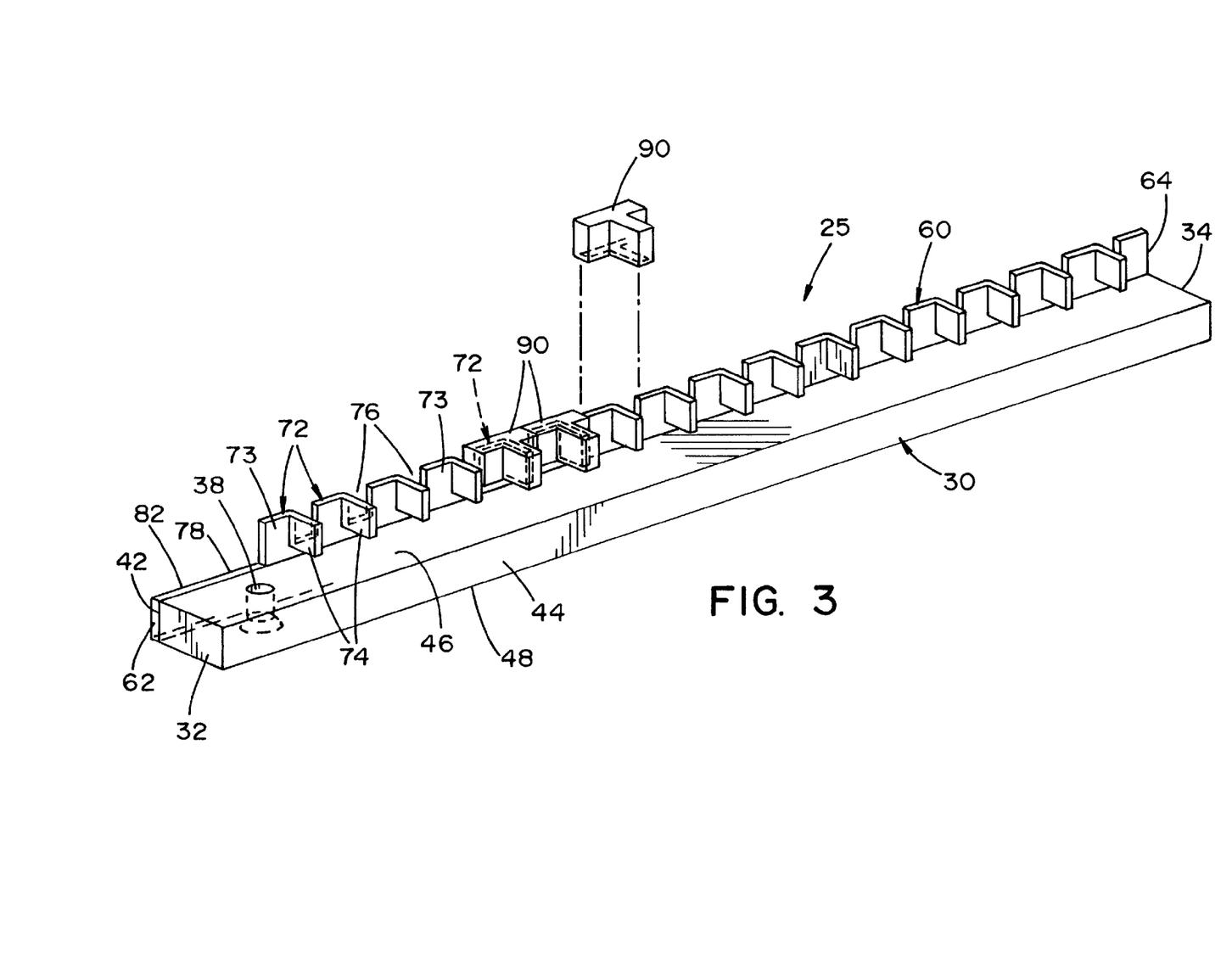
FIG. 3 is a perspective view of a bus bar of the bus bar assembly.
Figure 4:
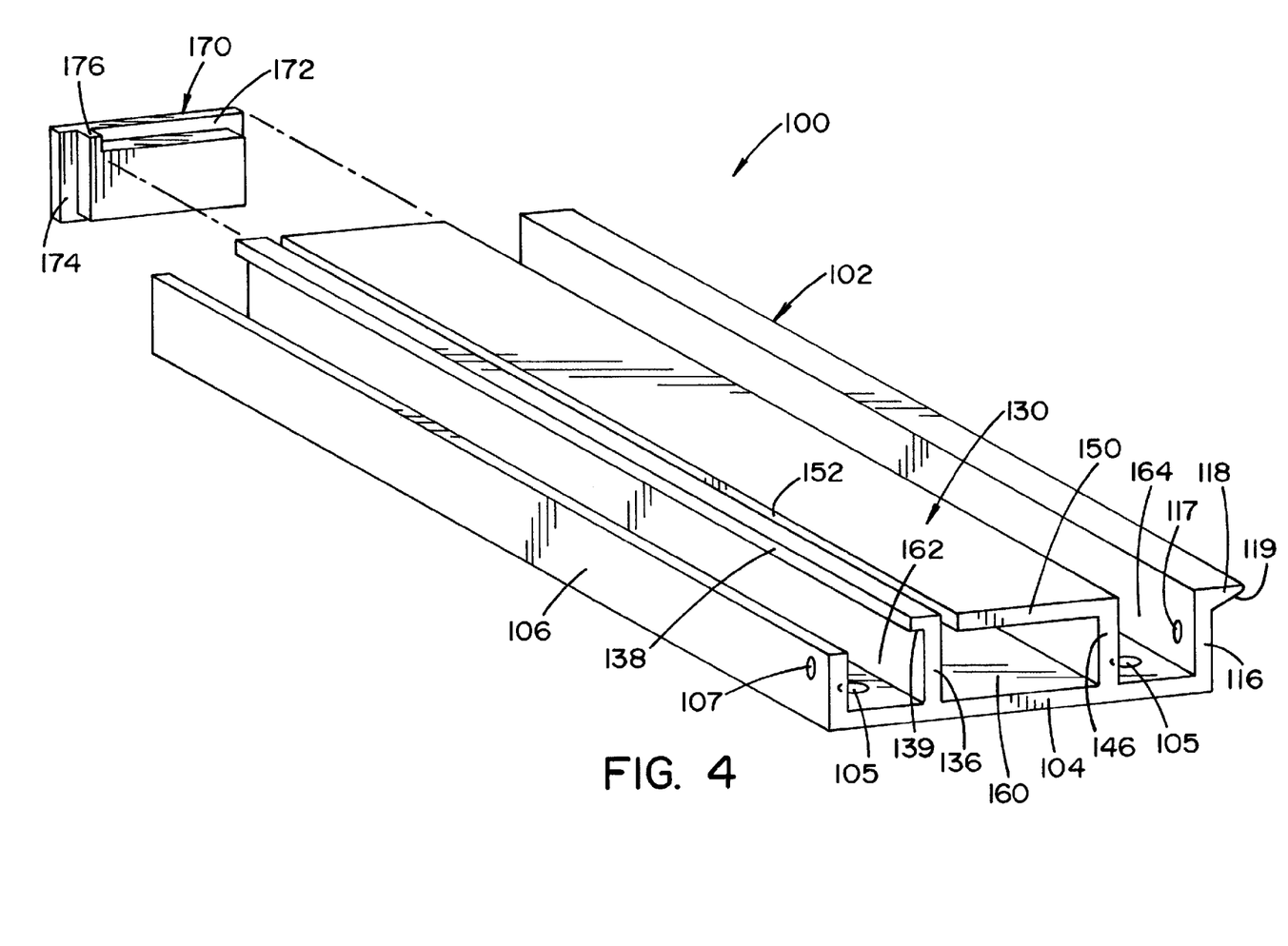
FIG. 4 is a perspective view of a mounting unit of the bus bar assembly.

Bus bar assembly 20 will now be described in detail with reference to FIGS. 3 and 4. Bus bar assembly 20 includes a bus bar 25, comprised of an elongated conductor 30 and a conductive plate 60 (FIG. 3), and a mounting unit 100 (FIG. 4). Conductor 30 and plate 60 are current carrying members, while mounting unit 100 is made of an electrically non-conductive (insulating) material, such as a plastic, to provide a "touch safe" enclosure for the components of bus bar 25. Mounting unit 100 provides a structure for "snap-lock" attachment of one or more fuse holders 230 to bus bar 25, thereby electrically connecting bus bar 25 with the conductive elements of fuse holder 230.

In the illustrated embodiment, conductor 30 takes the form of an elongated bar made of an electrically conductive material, such as copper, aluminum, copper alloy, aluminum alloy, or other suitable conductive material. Alternatively, conductor 30 may be comprised of multiple individual conductive elements that are joined together. Conductor 30 is a generally rectangular bar having a first end 32 and a second end 34. Conductor 30 also has a first side surface 42, a second side surface 44, an upper surface 46 and a lower surface 48. A recess 38 extends through conductor 30 at first end 32, and is dimensioned to receive a fastener, as will be discussed below.

In the illustrated embodiment, plate 60 takes the form of an elongated metal plate made of an electrically conductive material, such as copper, aluminum, copper alloy, aluminum alloy, or other suitable conductive material. Plate 60 has a first end 62 and a second end 64. The lower section of plate 60 takes the form of a planar strip 82. The upper section of plate 60 is comprised of a plurality of L-shaped contact members 72 spaced by gaps 76. Each L-shaped contact member 72 includes a finger portion 74 extending generally perpendicular to a first portion 73. A notch 78 is formed at first end 62 of plate 60.

T-shaped caps 90, made of an electrically non-conductive material (e.g., plastic), are dimensioned to fit over L-shaped contact members 72. Caps 90 are provided to cover unused L-shaped contact members 72, thereby maintaining "touch safe" operation, Bus bar 25 is assembled by arranging plate 60 adjacent to first side surface 42 of conductor 30, wherein first end 32 and second end 34 of conductor 30 respectively align with first end 62 and second end 64 of plate 60. In this arrangement, finger portions 74 extend over upper surface 46 of conductor 30. Plate 60 is attached to conductor 30 by suitable means, including but not limited to brazing/soldering; mechanical fasteners, such as screws, rivets, etc.; or welding, such as resistance welding. It should be understood that conductor 30 and plate 60 may alternatively be formed as a single component, thereby providing a unitary bus bar 25.

Mounting unit 100 is comprised of a main body 102 and an end cap 170. Main body 102 includes a base 104 having a plurality of holes 105 formed therein. Holes 105 are dimensioned to receive fasteners 101 for attaching mounting unit 100 to a support structure (e.g., a wall), as shown in FIG. 6. Main body 102 also includes first and second side walls 106, 116 that extend upward from base 104. First and second walls 106, 116 includes respective holes 107 and 117 dimensioned to receive fasteners 213 to attach lug housing 200 (FIG. 5) to main body 102, as shown in. FIG. 1. Second side wall 116 has an outward extending flange 118 having a tapered lower surface 119. Main body 102 further includes a sleeve portion 130 located between walls 106 and 116. Sleeve portion 130 has first and second upward extending walls 136, 146 and a top wall 150. First upward extending wall 136 has an outward extending flange 138 having a lower surface 139. Flange 138 of wall 136 extends in a direction opposite to the direction of flange 118 of side wall 116. An elongated slot 152 is located between top wall 150 and first upward extending wall 136, and extends along the length of main body 102.

Sleeve portion 130 defines a rectangular inner center channel 160 that is dimensioned to hold and enclose bus bar 25, as will be further described below. First side wall 106 and first upward extending wall 136 define a first lateral channel 162, while second side wall 116 and second upward extending wall 146 define a second lateral channel 164. Lateral channels 162 and 164 extend along the length of main body 102 on opposite sides of center channel 160.

End cap 170 has a generally rectangular shape, and includes a horizontal notch 172 and a vertical notch 174. End cap 170 is made of an electrically non-conductive (insulating) material, such as a plastic. Notches 172 and 174 form a vertical protrusion 176. End cap 170 is dimensioned to enclose one end of center channel 160 of main body 102. In this regard, end cap 170 is aligned with channel 160 and press fit therein such that protrusion 176 extends through slot 152.

It is further contemplated that end cap 170 may be attached to main body 102 by a mechanical fastener, an adhesive (e.g., glue), or ultrasonic welding.

Main body 102 and end cap 170 of mounting unit 100 are made of an electrically non-conductive (insulating) material (e.g., a plastic) in order to provide touch-safe operation.

Figure 2:
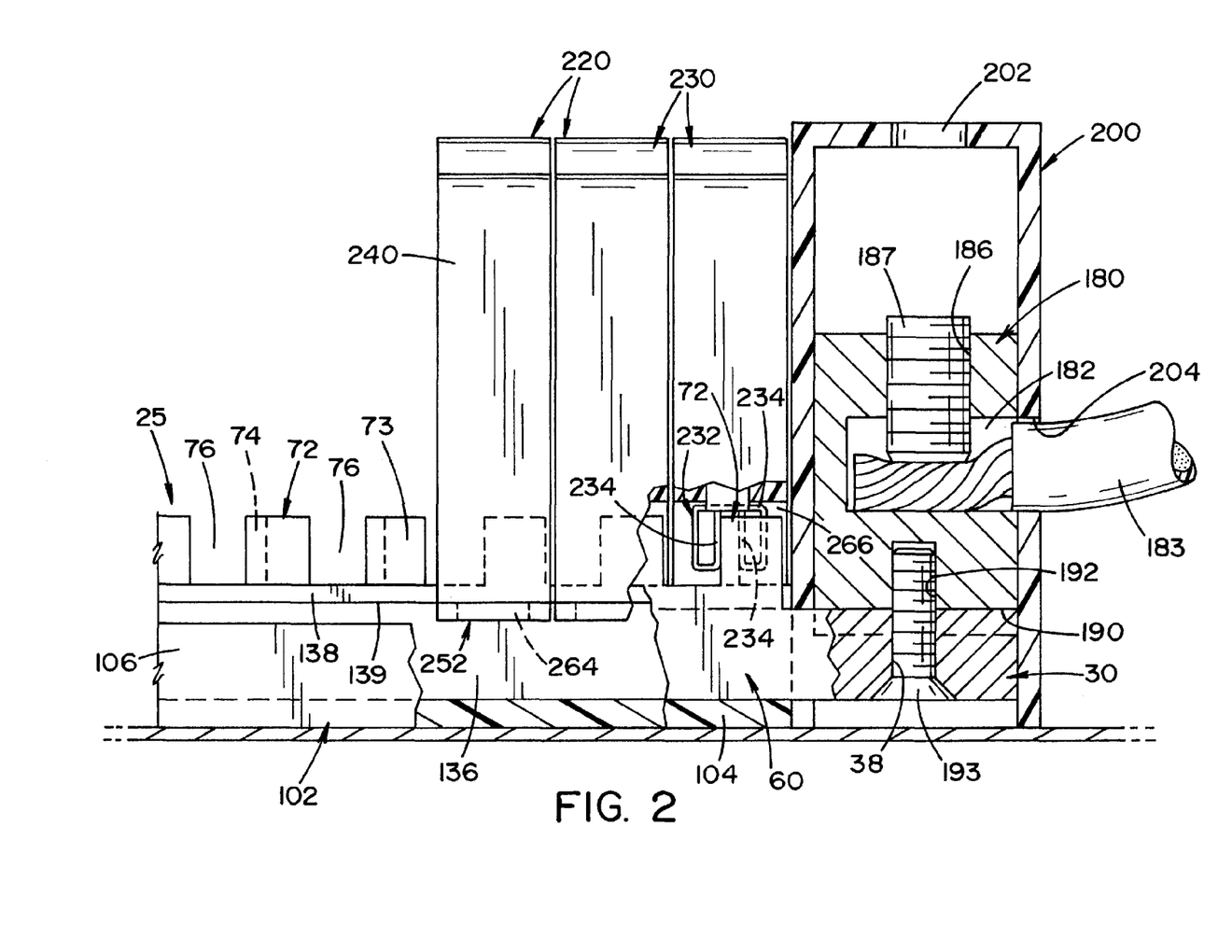
FIG. 2 is a partial sectional view of a portion of the terminal unit.

The lug assembly comprised of lug 180 and lug housing 200 will now be described with reference to FIGS. 1, 2 and 5. In the illustrated embodiment, lug 180 is a boxed-shaped multi-pole wire lug made of an electrically conductive material (e.g., copper, aluminum, copper alloy, aluminum alloy or other suitable conductive material). Lug 180 includes a pair of horizontally-oriented sockets 182 that are dimensioned to receive a conductor cable or wire 183. Therefore, single or multiple conductor cables or wires 183 may be attached to lug 180 depending upon the application for terminal unit 10. Lug 180 also includes a pair of vertical recesses 186 that are dimensioned to receive fasteners 187 for securing conductor wires 183 to lug 180, as best seen in FIG. 2.

In the illustrated embodiment, fasteners 187 take the form of threaded screws. A notch 190 is formed in the lower surface of lug 180 and is dimensioned to receive a top portion of bus bar 25, as best seen in FIG. 1. In this regard, lug 180 is seated on bus bar 25 and attached thereto by a fastener 193 that extends through hole 38 of conductor 30 and threads into a threaded recess 192 formed in lug 180, as best seen in FIG. 2.

Figure 5:
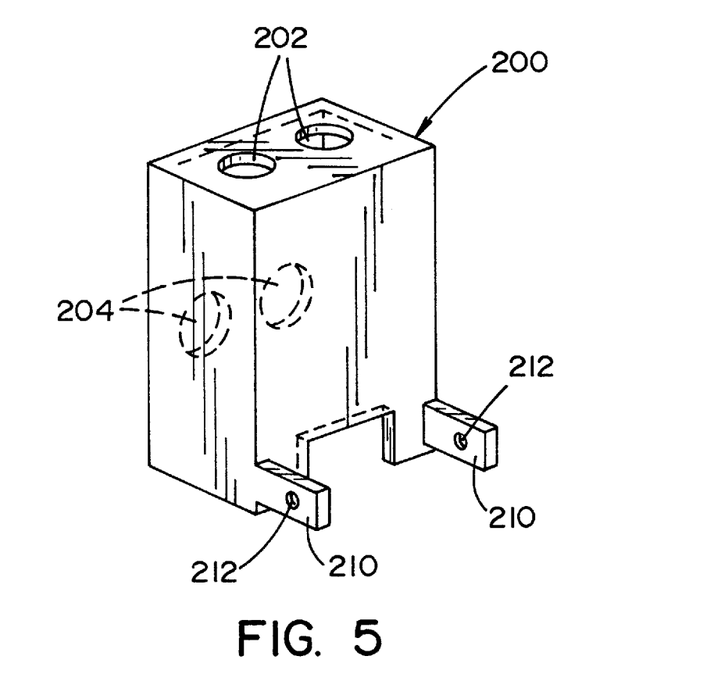
FIG. 5 is a perspective view of a housing for the lug.
Figure 6:
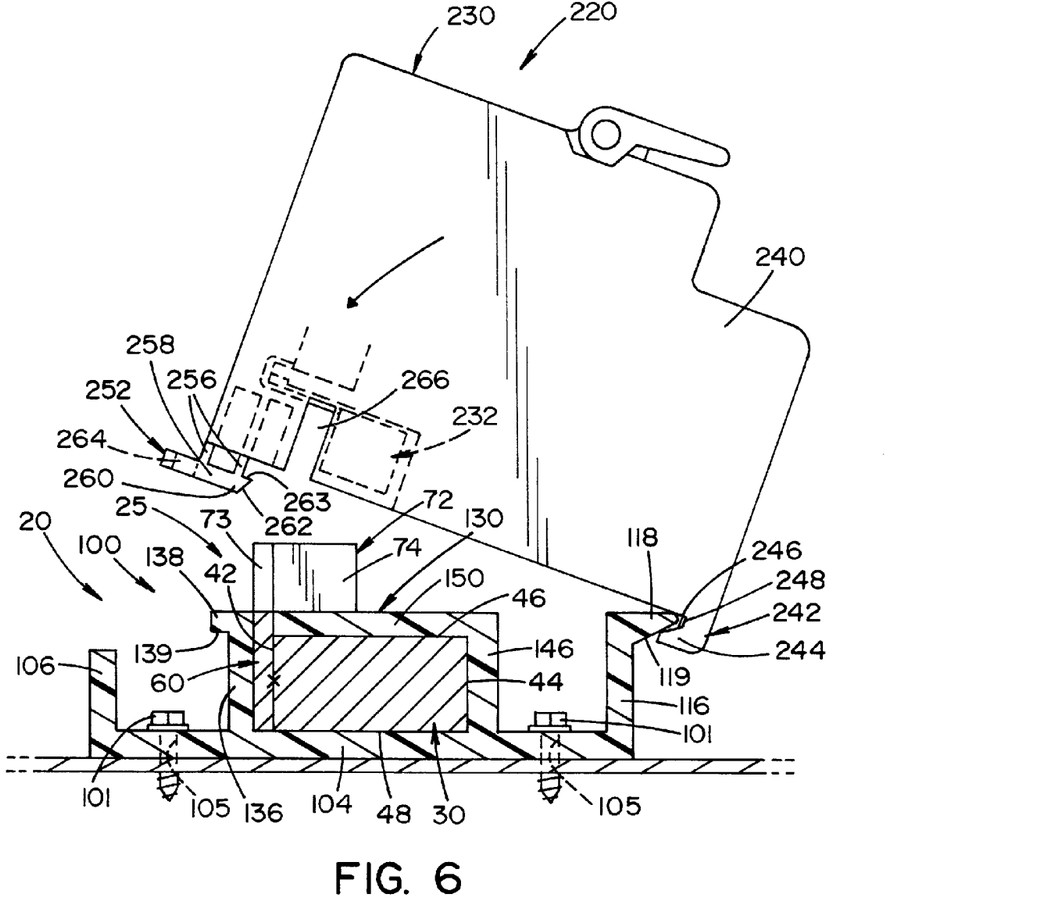
FIGS. 6-8 illustrate mounting of a fuse holder to the bus bar assembly shown in cross-section.

Referring now to FIG. 5, lug housing 200 is a generally box-shaped enclosure that is dimensioned to enclose lug 180 and provide "touch safe" operation. In this regard, lug housing 200 is made of an electrically non-conductive (insulating) material, such as a plastic. Lug housing includes outward extending legs 210. Each leg 210 has a hole 212. Legs 210 are respectively attached to first side wall 106 and second side wall 116 of mounting unit 100 by fasteners 213 that extend through holes 107, 117 and holes 212 formed in legs 210. Lug housing 200 also has vertical openings 202 that are aligned with vertical recesses 186, and horizontal openings 204 that are aligned with horizontal sockets 182.

Figure 7:
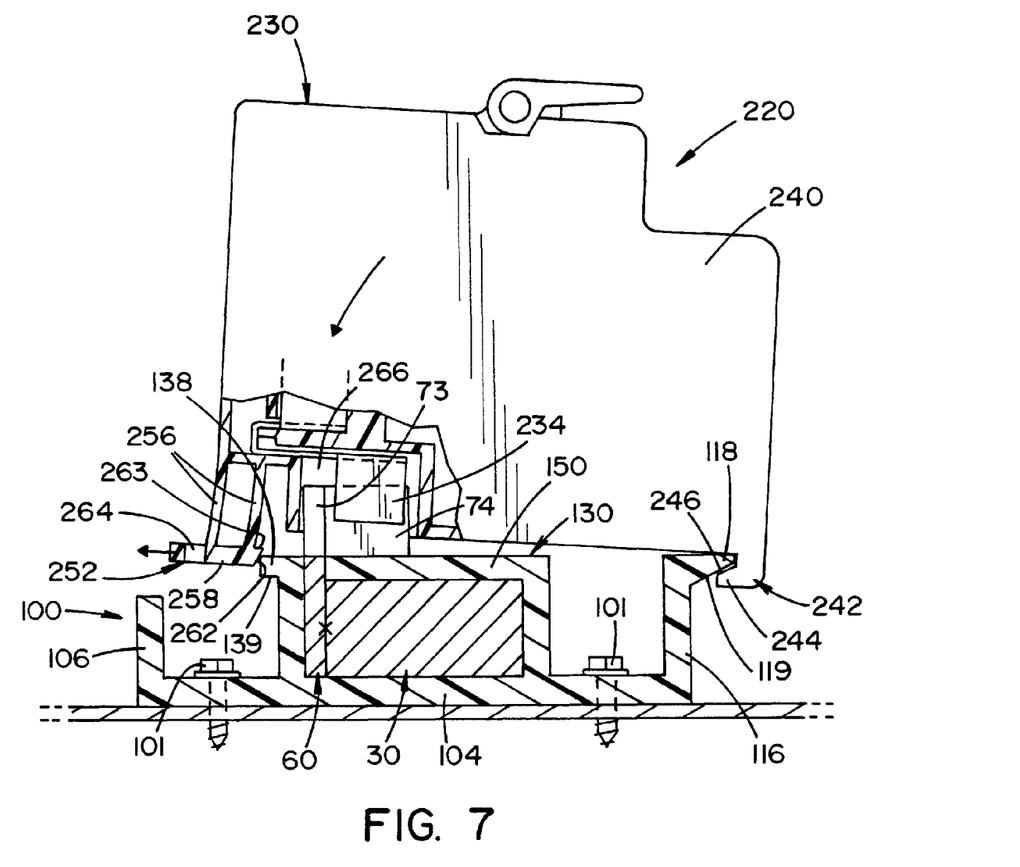
Figure 8:
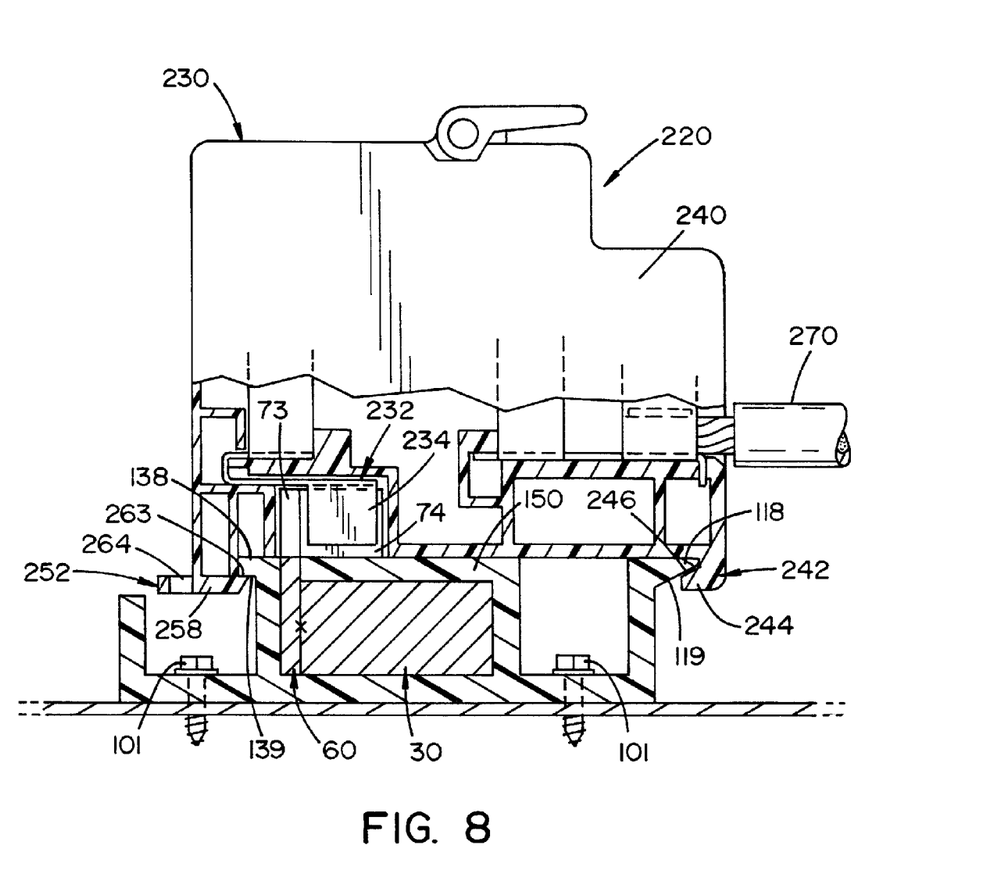

A plurality of circuit protection devices 220 are attached to bus bar assembly 20, as will now be described with reference to FIGS. 1-2 and 6-8. It should be appreciated that circuit protection device 220 may take many different forms, including, but not limited to, circuit breakers, fuses, and the like. However, in the illustrated embodiment, circuit protection device 220 is a fuse comprised of a fuse element (not shown) that is housed within a fuse holder 230 adapted to engage with bus bar assembly 20 of the present invention. Fuse holder 230 includes a housing 240 having an access door 241 for installation and removal of the fuse element. Housing 240 also includes a bottom slot 266 and opposing first and second engagement members 242, 252 located at opposite ends of housing 240, as best seen in FIGS. 6-8.

First engagement member 242 includes an L-shaped portion 244 having a tapered inner surface 246. The L-shaped portion 244 defines a recess 248. Second engagement member 252 includes a pair of spaced flexible vertical walls 256, and a horizontal wall 258 that connects vertical walls 256. A first end flange portion 260 of horizontal wall 258 has a sloped front face 262 and a planar top surface 263. A slot 264 is formed at a second end portion of horizontal wall 258.

Fuse holder 230 also includes a terminal 232 comprised of a pair of contacts 234, as best seen in FIG. 2. Terminal 232 is electrically connected with internal conductors (not shown) and the fuse element (not shown) to conduct current therethrough.

The illustrated circuit protection device 220 is exemplary of a device suitably adapted for use with bus bar assembly 20 of the present invention. It is contemplated that alternative circuit protection devices may be used in connection with the present invention when adapted for connection with the bus bar assembly of the present invention.

One application for terminal unit 10 is to provide a single combined output from a plurality of power generating devices. For example, the power generating device may be photovoltaic (PV) modules (also referred to as "solar panels") that convert sunlight into electricity. The PV modules are comprised of a plurality of series-connected solar cells. A plurality of PV modules are interconnected to form a photovoltaic (PV) array (also referred to as a "string"). In this application, each circuit protection device 220 of terminal unit 20 is electrically connected with a negative or positive output of a PV array (not shown) via a conductor cable 270. Accordingly, multiple PV arrays are combined to produce a single electrical output current at lug 180. Current is fed out via conductor cable or wire 183.

Assembly and operation of terminal unit 10 will now be described in detail in connection with a photovoltaic (PV) power generating system. Bus bar assembly 20 is assembled by inserting bus bar 25 (comprised of conductor 30 and plate 60) into center channel 160 of mounting unit 100, as best seen in FIGS. 6-8. A portion of planar strip 82 of plate 60 extends through slot 152. Accordingly, contact members 72 are located outside of sleeve portion 130, such that finger portions 74 are located over top wall 150 of sleeve portion 130. Caps 90 may be placed over each exposed contact member 72 to provide "touch safe" operation. End cap 170 is aligned with center channel 160 and press fit therein to enclose one end of center channel 160.

Lug 180 is mounted and to bus bar 25 and attached thereto by fastener 193 that extends through hole 38 of conductor 30 and threads into threaded recess 192 formed in lug 180, as best seen FIG. 2. Lug housing 200 is placed over lug 180 and attached at legs 210 to first and second side walls 106, 116 of mounting unit 100 by fasteners 213 (FIG. 1). Openings 202 and 204 of housing 200 are respectively aligned with recesses 186 and 182 of lug 180. Conductor cable or wire 183 is electrically connected to lug 180 by inserting wire 183 through opening 204 and into socket 182. Wire 183 is secured inside socket 182 by a fastener 187 inserted through opening 202 and threaded into recess 186.

Fasteners 101 are inserted through holes 105 of mounting unit 100 to mount bus bar assembly 20 to a support surface, as shown in FIGS. 6-8.

Attachment and detachment of fuse holders 230 to bus bar assembly 20 will now be described in detail with reference to FIGS. 6-8. Referring now to FIG. 6, first engagement portion 242 of housing 240 is positioned relative to flange 118 of second side wall 116 such that at least a portion of flange 118 is captured within recess 248 defined by L-shaped portion 244 of first engagement portion 242. In the illustrated embodiment, tapered inner surface 246 of L-shaped portion 244 contacts tapered lower surface 119 of flange 118. Next, second engagement member 252 of housing 240 is moved toward flange 138 of first upward extension wall 136, while maintaining tapered inner surface 246 of L-shaped portion 244 in contact with tapered lower surface 119 of flange 118. As front face 262 of second engagement member 252 contacts with the front edge of flange 138, vertical walls 256 flex in an outward direction. As a result, second engagement member 252 moves in a direction away from first engagement member 242, as shown in FIG. 7. At the same time, finger portion 74 of L-shaped contact member 72 is captured between contacts 234 of fuse holder 230, thereby establishing an electrical connection between bus bar 25 and the conductive elements of fuse holder 230. Furthermore, first portion 73 of L-shaped contact member 72 locates within bottom slot 266 of housing 240.

Fuse holder 230 is fully seated on bus bar assembly 20 when first end flange portion 260 of fuse holder 230 is captured beneath lower surface 139 of flange 138, as shown in FIG. 8. In the fully seated position, lower surface 139 of flange 138 contacts with top surface 263 of second engagement member 252. Furthermore, a portion of lower surface of housing 240 sits on top wall 150 of sleeve portion 130.

To detach a fuse holder 230 from bus bar assembly 20, vertical walls 256 are flexed in an outward direction so as to withdraw first end flange portion 260 of fuse holder 230 from beneath lower surface 139 of flange 138. To facilitate flexing of vertical walls 256 in an outward direction, slot 264 of fuse holder housing 240 is dimensioned to receive a tool, such as the end of a flat edge screw driver.

The foregoing description is a specific embodiment of the present invention. It should be appreciated that this embodiment is described for purposes of illustration only, and that numerous alterations and modifications may be practiced by those skilled in the art without departing from the spirit and scope of the invention. For instance, although the present invention has been described in connection with solar power producing applications, it should be understood that the present invention is also operable with non-solar power producing applications. It is intended that all such modifications and alterations be included insofar as they come within the scope of the invention as claimed or the equivalents thereof.

Having described the invention, the following is claimed:

1. A terminal unit comprising:
   a bus bar assembly including:
      a bus bar made of electrically conductive material, said bus bar including an elongated conductor and a plurality of contact members, and
      a mounting unit made of an electrically non-conductive material, said mounting unit including:
         a sleeve portion having an elongated inner channel dimensioned to enclose the elongated conductor, said sleeve portion including an elongated slot through which said plurality of contact members extend, and
         a pair of outward extending flanges; and
   one or more circuit protection devices electrically connectable with the bus bar and a circuit, each circuit protection device including:
      a housing having first and second opposing engagement members respectively engageable with the pair of outward extending flanges of the mounting unit for attaching the circuit protection device to the bus bar assembly, and
      a terminal that makes electrical contact with one of said contact members when said circuit protection device is attached to the bus bar assembly.

2. A terminal unit according to claim 1, wherein said terminal unit further comprises caps made of electrically non-conductive material for covering unused contact members.

3. A terminal unit according to claim 1, wherein said bus bar is further comprises a conductive plate, wherein the plurality of contact members are formed at one edge of said conductive plate.

4. A terminal unit according to claim 1, wherein said mounting unit further comprises a pair of lateral channels respectively located on opposite sides of said sleeve portion.

5. A terminal unit according to claim 1, wherein
said first engagement member of each circuit protection device includes an L-shaped portion defining a recess, and
said second engagement member of each circuit protection device includes at least one flexible vertical wall and a flange portion.

6. A terminal unit according to claim 5, wherein said flange portion has a sloped front face and a planar top surface.

7. A terminal unit according to claim 1, wherein said circuit protection device is a fuse having a fuse holder and a fuse element housed therein.

8. A terminal unit according to claim 1, wherein said mounting unit further comprises a pair of end caps for covering first and second ends of said elongated inner channel.

9. A terminal unit according to claim 1, wherein said terminal unit further comprises a lug assembly including:
a lug made of electrically conductive material, wherein said lug is electrically connected with said bus bar, and includes at least one socket for electrically connecting a conductor to said lug, and
a lug housing made of an electrically non-conductive material, said lug housing covering said lug.

10. A terminal unit according to claim 9, wherein said lug housing is attached to said mounting unit.

11. A bus bar assembly comprising:
a bus bar made of electrically conductive material, said bus bar including an elongated conductor and a plurality of contact members for making electrical contact with a circuit protection device attachable to the bus bar assembly;
a mounting unit made of an electrically non-conductive material, said mounting unit including:
a sleeve portion having an elongated inner channel dimensioned to enclose the elongated conductor, said sleeve portion including an elongated slot through which said plurality of contact members extend, and
a pair of outward extending flanges that respectively engage with first and second opposing engagement members of the circuit protection devices attachable to the bus bar assembly.

12. A bus bar assembly according to claim 11, wherein said bus bar assembly further comprises caps made of electrically non-conductive material for covering unused contact members.

13. A bus bar assembly according to claim 11, wherein said bus bar further comprises a conductive plate, wherein the plurality of contact members are formed at one edge of said conductive plate.

14. A bus bar assembly according to claim 11, wherein said mounting unit further comprises a pair of end caps for covering first and second ends of said elongated inner channel.

* * * * *